US008024549B2

(12) United States Patent
Stewart

(10) Patent No.: US 8,024,549 B2
(45) Date of Patent: Sep. 20, 2011

(54) TWO-DIMENSIONAL PROCESSOR ARRAY OF PROCESSING ELEMENTS

(75) Inventor: Malcolm Stewart, Ottawa (CA)

(73) Assignee: Mtekvision Co., Ltd., Seoul (KR)

( * ) Notice: Subject to any disclaimer, the term of this patent is extended or adjusted under 35 U.S.C. 154(b) by 579 days.

(21) Appl. No.: 11/308,028

(22) Filed: Mar. 3, 2006

(65) Prior Publication Data

US 2006/0212613 A1 Sep. 21, 2006

Related U.S. Application Data

(60) Provisional application No. 60/658,148, filed on Mar. 4, 2005.

(51) Int. Cl.
*G06F 15/76* (2006.01)
(52) U.S. Cl. ........................... 712/22; 712/10
(58) Field of Classification Search ............ 712/22, 712/10
See application file for complete search history.

(56) References Cited

U.S. PATENT DOCUMENTS

| 4,831,573 | A | * | 5/1989 | Norman | 708/230 |
| 5,956,274 | A | * | 9/1999 | Elliott et al. | 365/189.04 |
| 6,145,072 | A | * | 11/2000 | Shams et al. | 712/22 |
| 6,260,088 | B1 | * | 7/2001 | Gove et al. | 710/100 |
| 6,728,862 | B1 | * | 4/2004 | Wilson | 712/14 |
| 6,735,688 | B1 | * | 5/2004 | Upton et al. | 712/218 |
| 6,839,828 | B2 | * | 1/2005 | Gschwind et al. | 712/20 |
| 7,146,486 | B1 | * | 12/2006 | Prokopenko et al. | 712/22 |
| 7,308,559 | B2 | * | 12/2007 | Glossner et al. | 712/23 |
| 2003/0120901 | A1 | * | 6/2003 | Hokenek et al. | 712/215 |

* cited by examiner

*Primary Examiner* — Jacob A Petranek
(74) *Attorney, Agent, or Firm* — Birch, Stewart, Kolasch & Birch, LLP

(57) ABSTRACT

A data processor apparatus comprises a plurality of data receiving means each for receiving data from a data source; a computational element coupleable to each of said data receiving means for performing an operation on said data; and a controller for controlling the flow of data from each data receiving means to the computational element.

29 Claims, 8 Drawing Sheets

| TIME | MEMORY | DATA RECEIVING UNIT | | | |
|---|---|---|---|---|---|
| | | 0 | 1 | 2 | 3 |
| 101 | PRE | | | | |
| 102 | RAS | | | | |
| 103 | CAS | | | | |
| 104 | | LDX | | | |
| 105 | | MULT0 | LDX | | |
| 106 | | MULT1 | MULT0 | LDX | |
| 107 | PRE | ALU | MULT1 | MULT0 | LDX |
| 108 | RAS | | ALU | MULT1 | MULT0 |
| 109 | CAS | | | ALU | MULT1 |
| 110 | | LDY | | | ALU |
| 111 | | ALU | LDY | | |
| 112 | | ALU | ALU | LDY | |
| 113 | | | ALU | ALU | LDY |
| 114 | | | | ALU | ALU |
| 115 | | | | | ALU |
| 116 | | | | | |

FIG. 6

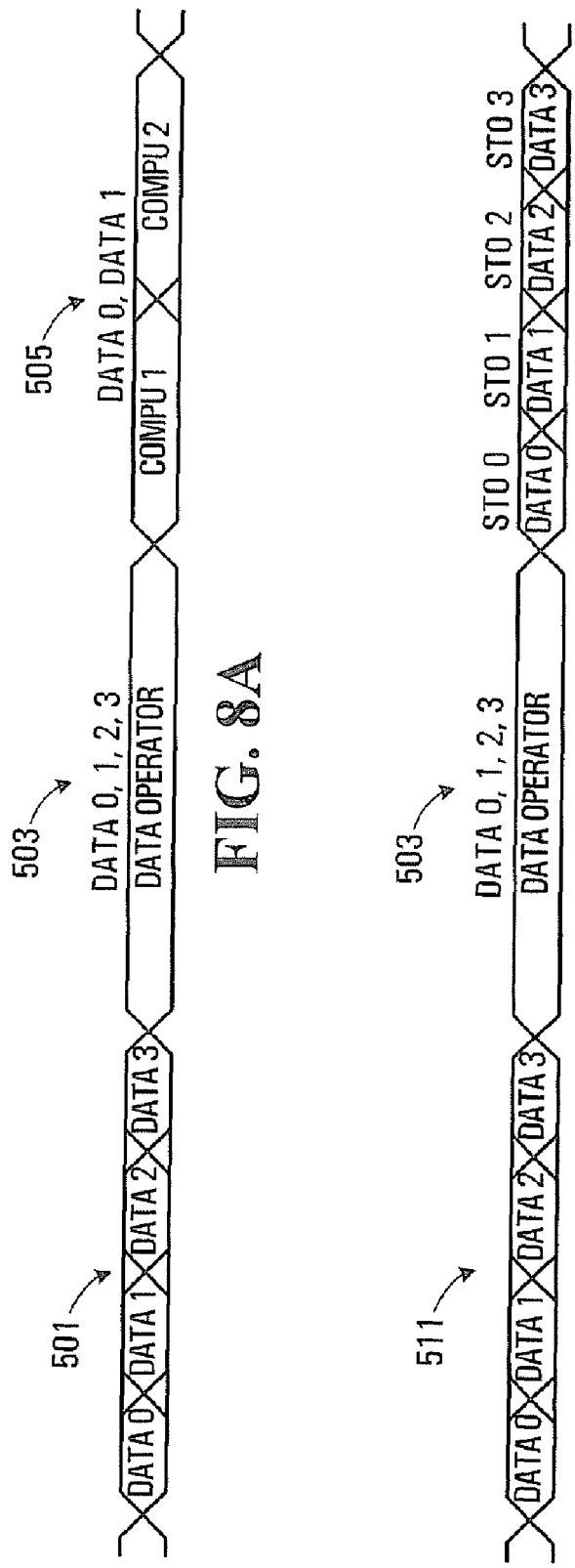

TWO-DIMENSIONAL PROCESSOR ARRAY OF PROCESSING ELEMENTS

CROSS REFERENCE TO RELATED APPLICATION

This application claims the benefit of U.S. provisional application Ser. No. 60/658,148, filed Mar. 4, 2005 the disclosure of which is incorporated herein by reference.

BACKGROUND OF THE INVENTION

This invention broadly relates to parallel processing in the field of computer technology, and more particularly concerns systems, devices and methods for transferring data in an efficient manner for a parallel computer such as a Single Instruction Multiple Data (SIMD) data processor.

Parallel processing is increasingly used to meet the computing demands of the most challenging scientific and engineering problems, since the computing performance required by such problems is usually several orders of magnitude higher than that delivered by general-purpose serial computers.

Whilst different parallel computer architectures support differing modes of operation, in very general terms, the core elements of a parallel processor include a network of processing elements (PEs) each having one or more data memories and operand registers, with each of the PEs being interconnected through an interconnection network (IN).

One of the most extensively researched approaches to parallel processing concerns Array Processors, which are commonly embodied in single instruction stream operating on multiple data stream processors (known as Single Instruction Multiple Data or SIMD processors). The basic processing units of an SIMD processor are an array of processing elements (PEs), memory elements (M), a control unit (CU), and an interconnection network (IN). In operation, the CU fetches and decodes a sequence of instructions from a program, then synchronises all the PEs by broadcasting control signals to them. In turn, the PEs, operating under the control of a common instruction stream, simultaneously execute the same instructions but on the different data that each fetches from its own memory. The interconnection network facilitates data communication among processing units and memory. Thus the key to parallelism in SIMD processors is that one instruction operates on several operands simultaneously rather than on a single one.

An example of such a data processor architecture is disclosed in International Patent Application No. PCT/CA02/00299, Publication No. WO 02/071246, to Atsana Semiconductor Corporation, the entire contents of which is incorporated herein by reference. An example of a data processor disclosed in this document is shown in FIG. 1. The apparatus comprises a memory block 1, a two-dimensional array of processor elements (PEs) 3 each of which can be coupled to the memory via a switching element (SE) 5. Each processor element may comprise a single bit processor element and a computational unit (CU) comprises a predetermined number of processor elements generally formed from a row of contiguous PEs, as shown in FIG. 2. Data from the memory block can be downloaded into each CU sequentially and data processing may be performed by each CU sequentially, row by row, or simultaneously, (i.e. in parallel) once data has been downloaded into all CUs.

One of the main advantages of the memory time-multiplex CU architecture is that the vertical transfer of data between the processor elements (or CUs) can be performed very efficiently. For example, referring to FIG. 1, it would only take one cycle to load data from one row of PEs to another row of PEs, for example row n into row 0. In a previous architecture it would take n−1 cycles (assuming it is possible to write from CU register to neighbouring CU register through the switching element(s) 5.

Another advantage of this architecture is that a deeper memory can be used (e.g. 1024 rows or greater) because the memory requirement per CU can be shared, and communication through the Switching Element is minimized allowing more time for memory accesses. For example, one implementation may require 4 kbytes/CU, and therefore if the memory is shared between 4 CU's, this would mean that a 16 kbyte deep memory could be used.

As multiple CUs share the same memory space, CU accesses to memory must be pipelined. This means that each row of CUs is loaded with data from the memory in successive cycles so that, for example, the row 0 CUs are loaded with data in one cycle followed by the row 1 CUs in the next cycle, followed by the row 2 CUs in the next cycle, and so on to row n. This is illustrated in the timing diagram 28 in FIG. 2, which shows successive data download cycles from the memory, where "DATA 0" in is the cycle in which data is downloaded from the memory into the first Computational Unit CU0, and so on. As mentioned above, there are two different ways of processing the data row from memory: the first is to pipeline operations, and the second is to wait until all the memory reads are complete and have the CUs operate simultaneously. The reason that this architecture improves timing between the memory and the CU is that the data output from memory only goes through a single switching stage, and the interconnect between that switching stage and its nearest neighbour is very short. A problem with this architecture is that the latency of the device is increased relative to an unpipelined structure in which each processor is arranged in a one dimensional array and has its own dedicated section of memory so that all processors perform memory reads in parallel.

SUMMARY OF THE INVENTION

According to the present invention, there is provided a data processor apparatus comprising: a plurality of data receiving means each for receiving data from a data source; a computational element coupleable to each of said data receiving means for performing an operation on said data; and a controller for controlling the flow of data from each data receiving means to the computational element.

Also according to the present invention, there is provided a data processor apparatus comprising a memory, a plurality of data receiving means, each capable of accessing the same section of said memory, data operator means for performing an operation on data received from said memory section, and a controller adapted to control the timing of transfer of data from said memory section to each data receiving means such that the time to transfer data from memory into a data receiving means is different (e.g. less or more) to the time for said data operator means to perform an operation on data.

According to the present invention, there is further provided a data processor apparatus comprising a memory and a plurality of processor elements in which at least one processor element is capable of accessing said memory and the other processor element(s) are capable of receiving data from at least one of said memory and another processor element, and a controller for controlling the speed of operation of each processor element such that the rate at which at least one processor element operates is different from the rate at which at least one other data processor element operates.

According to the present invention, there is further provided a data processor apparatus comprising a memory, and a plurality of data processor elements (or computational units) capable of accessing said memory, and wherein at least one processor element (or computational unit) is adapted to perform a different operation on data than at least one other data processor element (or computational unit).

BRIEF DESCRIPTION OF THE DRAWINGS

Examples of embodiments of the present invention will now be described with a reference to the drawings, in which:

FIG. 6 shows a timing diagram illustrating an example of operation of the data processor apparatus of FIG. 5.

FIGS. 8A and B each shows a timing diagram illustrating examples of operation of the data processor apparatus of FIG. 7.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts.

DETAILED DESCRIPTION

Figure 1:
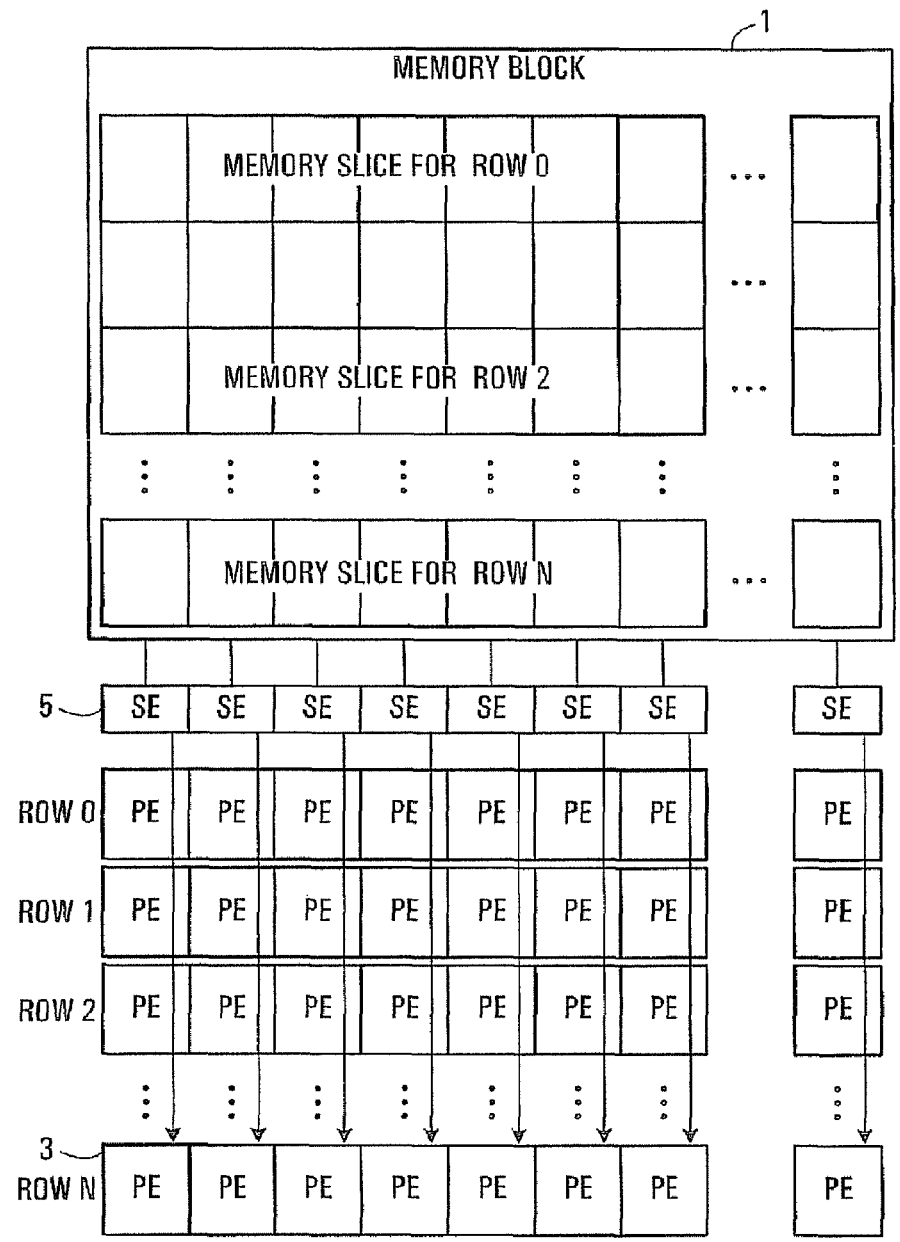
FIG. 1 shows a block diagram of an example of a data processor apparatus.
Figure 2:
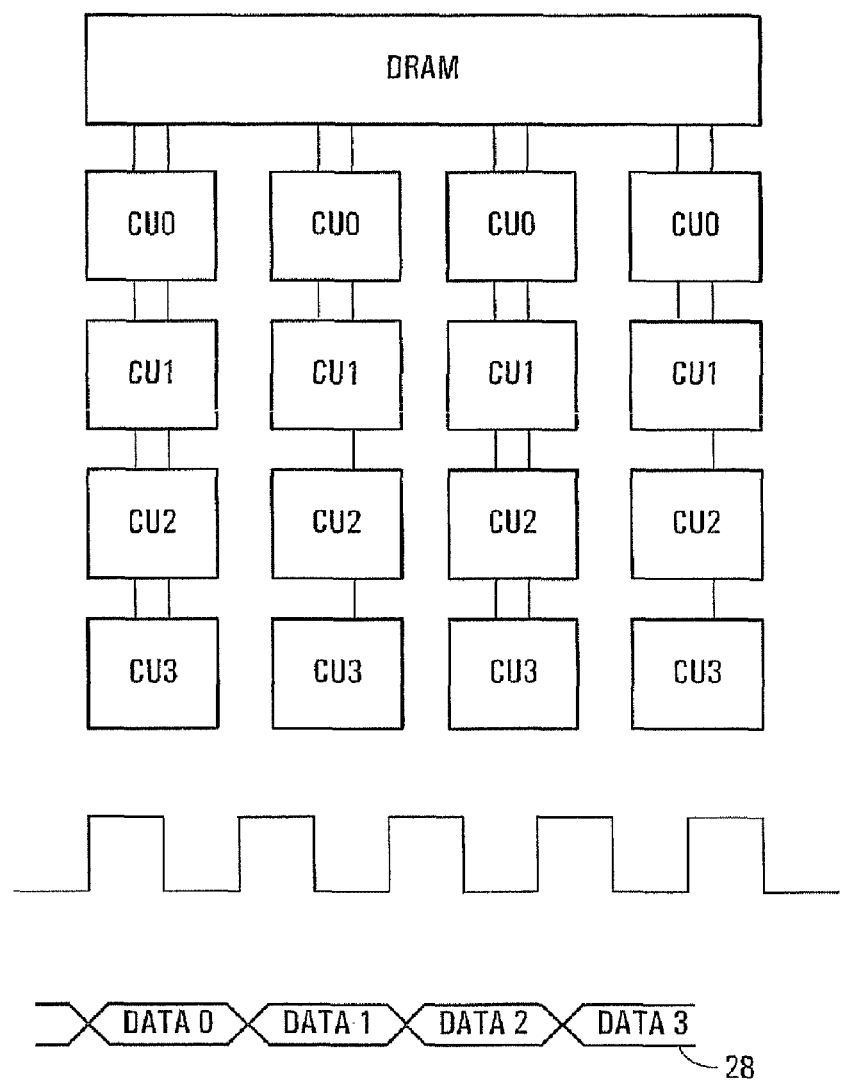
FIG. 2 shows a schematic diagram of another example of a data processor apparatus.
Figure 3:
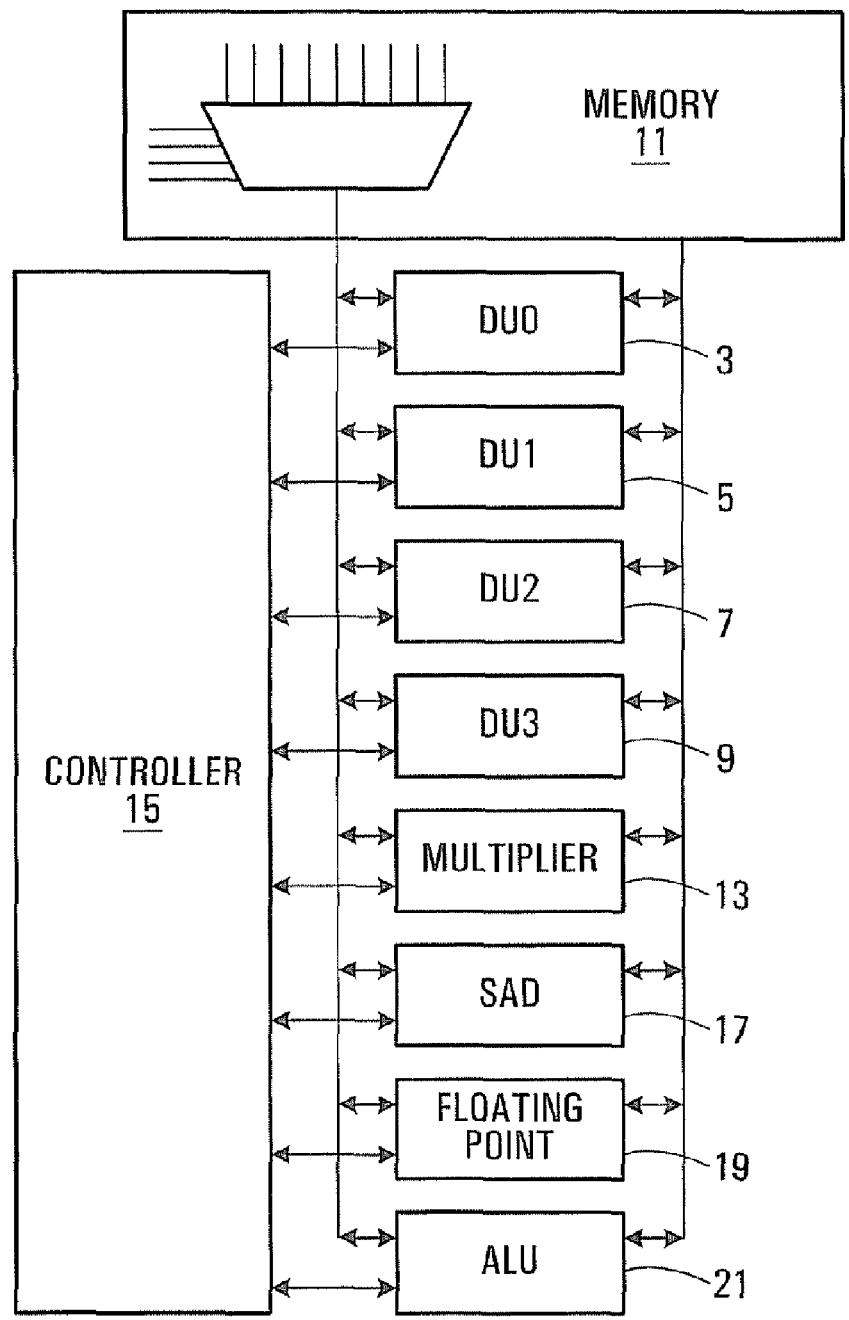
FIG. 3 shows a block diagram of a data processor apparatus according to an embodiment of the present invention

Referring to FIG. 3, a data processor apparatus according to an embodiment of the present invention comprises a plurality of data receiving units (DU) 3, 5, 7, 9 each of which can be coupled to a data source, for example a memory 11. The data processor 1 further comprises a computational element or block 13 coupleable to each of the data receiving units for receiving data therefrom and for performing an operation on the data. The data processor apparatus also includes a controller 15 for controlling the flow of data from each data receiving unit to the computational element 13. Whereas previously, the data receiving units may each comprise a computational element having the capability of performing a range of operations on data, the present arrangement allows the data receiving units to be simplified by permitting complex logic to be transposed from each data receiving unit to one or more other units (or elements) which are shared between the data receiving units. Advantageously, this simplifies fabrication of the device since complex logic does not need to be included in each data receiving unit, and reduces the area of the device.

A data receiving unit may simply comprise one or more registers for temporarily storing data. Alternatively, a data receiving unit may comprise circuitry for performing operations on data, and optionally include one or more registers.

The shared computational element may be any desired computational unit having any desired function, non-limiting examples of which may include a multiplier, a sum-of-absolute-differences (SAD) block, an arithmetic logic unit (ALU) and a floating point (FP) unit, as well as other units or elements.

A multiplier block is typically very large. In the absence of a shared multiplier block, multiplication would be performed in each data receiving unit (or computational unit) by a series of add and shift operations. By sharing a multiplier among multiple data receiving units, the overall cost of the multiplier is averaged out.

A sum of absolute differences (SAD) block is widely used in video processing. Therefore, if the data processor is to be used for video processing, providing a shared SAD computational block (which may be single cycle, for example) is very beneficial.

Providing a shared arithmetic logic unit block allows the ALU block in each CU to be removed.

A floating point unit performs operations that can be very beneficial for graphical operations (e.g. gaming), for example if the data processor apparatus is incorporated in a SIMD processor.

Although in some embodiments one or more data receiving units may include circuitry for performing operations on data, and may be capable of performing the same or similar operation on data as the shared resource, the addition of a shared resource (e.g. computational element or block) can be useful and increase the flexibility and capability of the system.

As shown in FIG. 3, the data processor apparatus may comprise more than one shared computational element or block, and in the present embodiment includes a multiplier 13, a SAD block 17, a floating point unit 19 and arithmetic logic unit 21. However, it will be appreciated that other embodiments may have fewer or more shared computational elements, and the computational elements may be different from those illustrated in FIG. 3.

Figure 4:
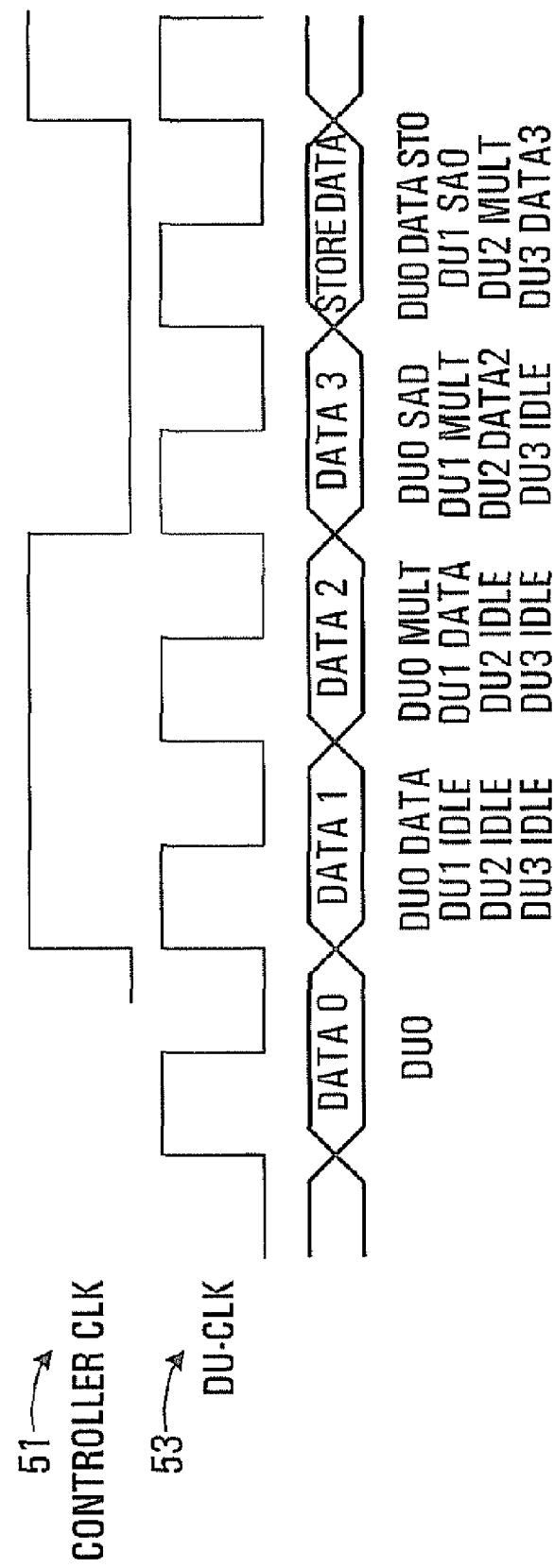
FIG. 4 shows an example of a timing diagram to exemplify operation of the data processor apparatus of FIG. 3.

FIG. 4 shows an example of a timing diagram which illustrates how two computational elements may be shared between the data receiving units (DUs). The upper part of the figure shows an example of the controller clock 51 and the data receiving unit clocks 53. With reference also to FIG. 3, in this example, in a first clock cycle data is read out from data receiving unit 3 into the computational element (e.g. multiplier block 13) while in the same clock cycle the other data receiving units remain idle. In the next clock cycle, the computational element 13 operates on the data from the first data receiving unit 3, data is read out from the second data receiving unit 5 and the other data receiving units remain idle. In the third clock cycle, data from the first computational element is transferred to and operated on by a second computational element (e.g. SAD unit 17), data from the second receiving unit is operated on by the first computational element and data is read from the third data receiving unit 7 into the first computational element 13. In the fourth cycle, data processed by the second computational element is stored, data received by the second computational element from the first computational unit is processed, data from the third data receiving unit is processed by the first computational element, and data is passed from the fourth data receiving unit to the first computational unit.

As can be seen, in this embodiment, the same sequence of operations is performed for each data receiving unit and the sequences are offset relative to each other by one clock cycle. To implement this, the controller 15 may be adapted to transmit the same set of commands to each data receiving unit with an appropriate delay. Thus, in the example described above, the controller transmits the command set to the first data receiving unit 3 then transmits a second version of the command set to the second data receiving unit delayed by one clock cycle relative to the first command set, then sends a third version of the command set to the third data receiving unit delayed by two clock cycles relative to the first version and subsequently transmits a fourth version of the command set to the fourth data receiving unit which is delayed by three cycles relative to the first command set. Delay of the command set signals can be achieved using any suitable delay means, for example by using DFFs (flip-flops). A one clock cycle delay between successive sequences ensures that processing using the shared resources is performed as efficiently as possible.

Figure 5:
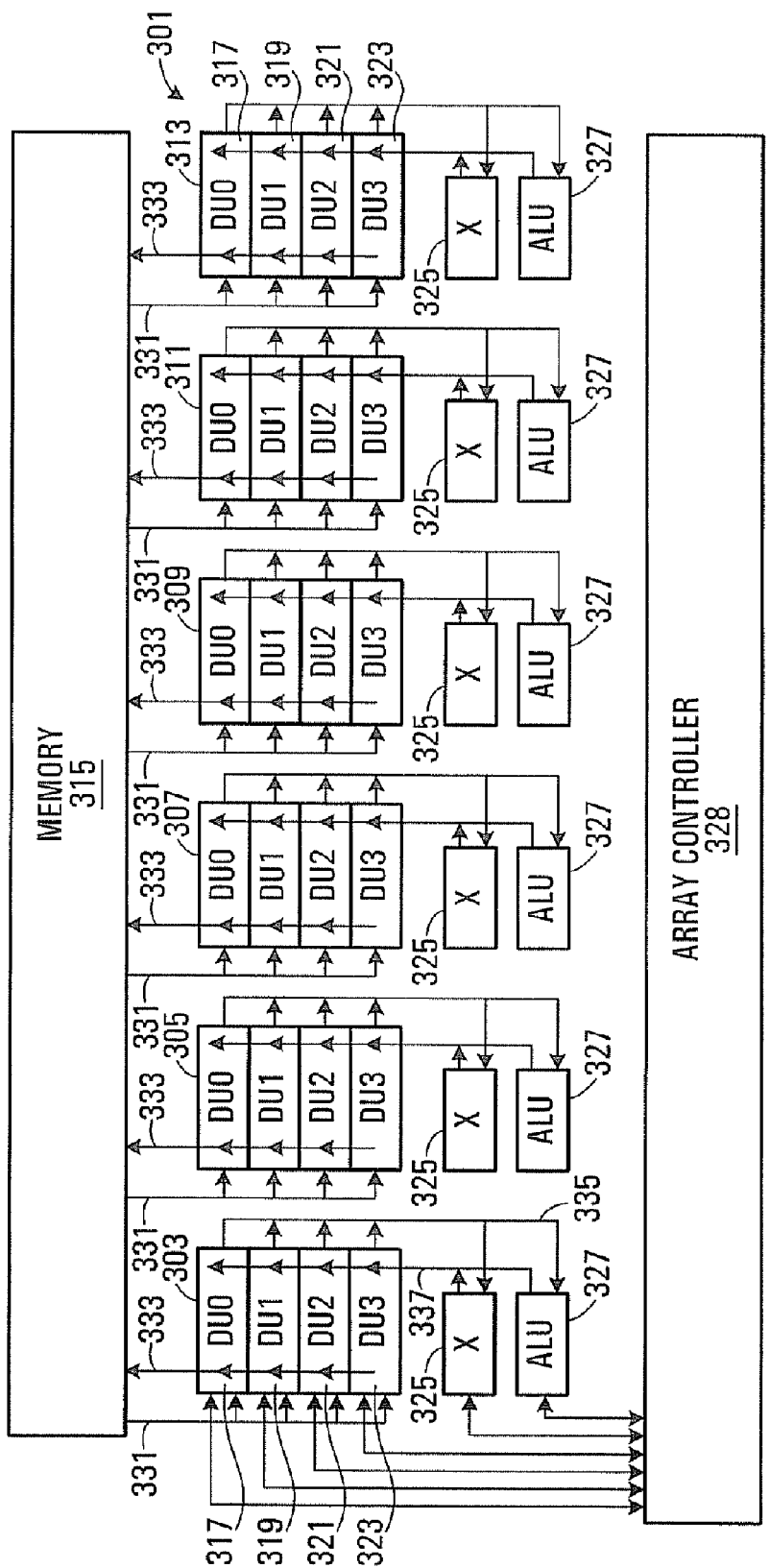
FIG. 5 shows a block diagram of a data processor apparatus according to another embodiment of the present invention.

FIG. 5 shows another embodiment of a data processor apparatus. The processor apparatus 301 comprises a plurality of processor groups 303, 305, 307, 309, 311, 313 each coupled to a memory 315. Each processor group comprises a plurality of data receiving units (DU's) (four in this example) 317, 319, 321, 323. Each processor group also comprises one or more computational elements 325, 327. In this example, the first computational element 325 comprises a multiplier and the second computational element 327 comprises an arithmetic logic unit (ALU). Each of the data receiving units 317, 319, 321, 323 can both receive data from memory and transfer data into memory via data line 331, 333, respectively, and each data receiving unit can also transfer data to and receive data from each computational element 325, 327 via data lines 335, 337, respectively. One or more data receiving units may also be capable of passing data to one or more other data receiving units.

The data processor apparatus 301 also includes a controller 328 for controlling each processor group and may be adapted to transmit the same set of instructions to each processor group. The controller may control two or more processor groups to operate in parallel, for example, by transmitting the command set to each group simultaneously. In this way, the data processor apparatus can be configured to operate as a SIMD (single-instruction-multiple-data) processor.

FIG. 6 shows a table of an example of a sequence of operations for each data receiving unit and which may be performed for each processor group. The sequence is the same for each data receiving unit within a processor group but the sequences for the data receiving units within each processor group are offset for example by one cycle. In this embodiment, each shared multiplier 325 may be a two cycle multiplier.

Referring to the Table of FIG. 6, from left to right, the first column indicates the cycle count, the second column indicates the memory operations and the third to seventh columns show the status associated with each data receiving unit.

The sequence associated with each data receiving unit begins by downloading data from memory to each data receiving unit using instructions RAS (row address strobe) along with the row address and CAS (column address strobe) along with the column address in consecutive cycles. The first iteration of the sequence is started by the first data receiving unit and comprises loading the received data into the multiplier (LDX), performing two multiplication steps (MULT0, MULT1) and a single ALU step (ALU), subsequently downloading data (Y) (LDY) into the data receiving unit from memory, transferring data Y from the data receiving unit to the ALU and subsequently performing two ALU cycles. The sequence associated with the second data receiving unit begins one cycle after the sequence associated with the first data receiving unit begins, the third sequence associated with the third data receiving unit starts two cycles after the first sequence begins and the fourth sequence associated with the fourth data receiving unit starts three cycles after the first sequence begins, as shown in the Table. If each data receiving unit is to access its data from a different part of the memory than another data receiving unit, memory access cycles using RAS and CAS signals may be implemented as required. For example, if data for each data receiving unit is stored in the same row but adjacent columns, appropriate column addresses and CAS signals may be applied successively after the first CAS signal so that, for example, a CAS signal is applied in cycle 104 to download data into the second data receiving unit from a different column of memory, a third CAS signal may be applied at time 105 to download data from a different column of memory into the third data receiving unit and a fourth CAS signal may be applied at time 106 to download data from yet another column of memory into the fourth data receiving unit.

According to another aspect of the present invention, the memory may be operated at a different rate from one or more data receiving units and/or one or more computational units. Furthermore, according to another aspect of the present invention, one or more data receiving units may be operated at a different rate to one or more computational units. Either one or both of these aspects of the present invention may be implemented in any of the embodiments described herein, including the embodiments described above, including and those shown in FIGS. 1 to 6. Any of these aspects may also be implemented in any of the embodiments disclosed or claimed in PCT/CA02/00299.

Figure 7:
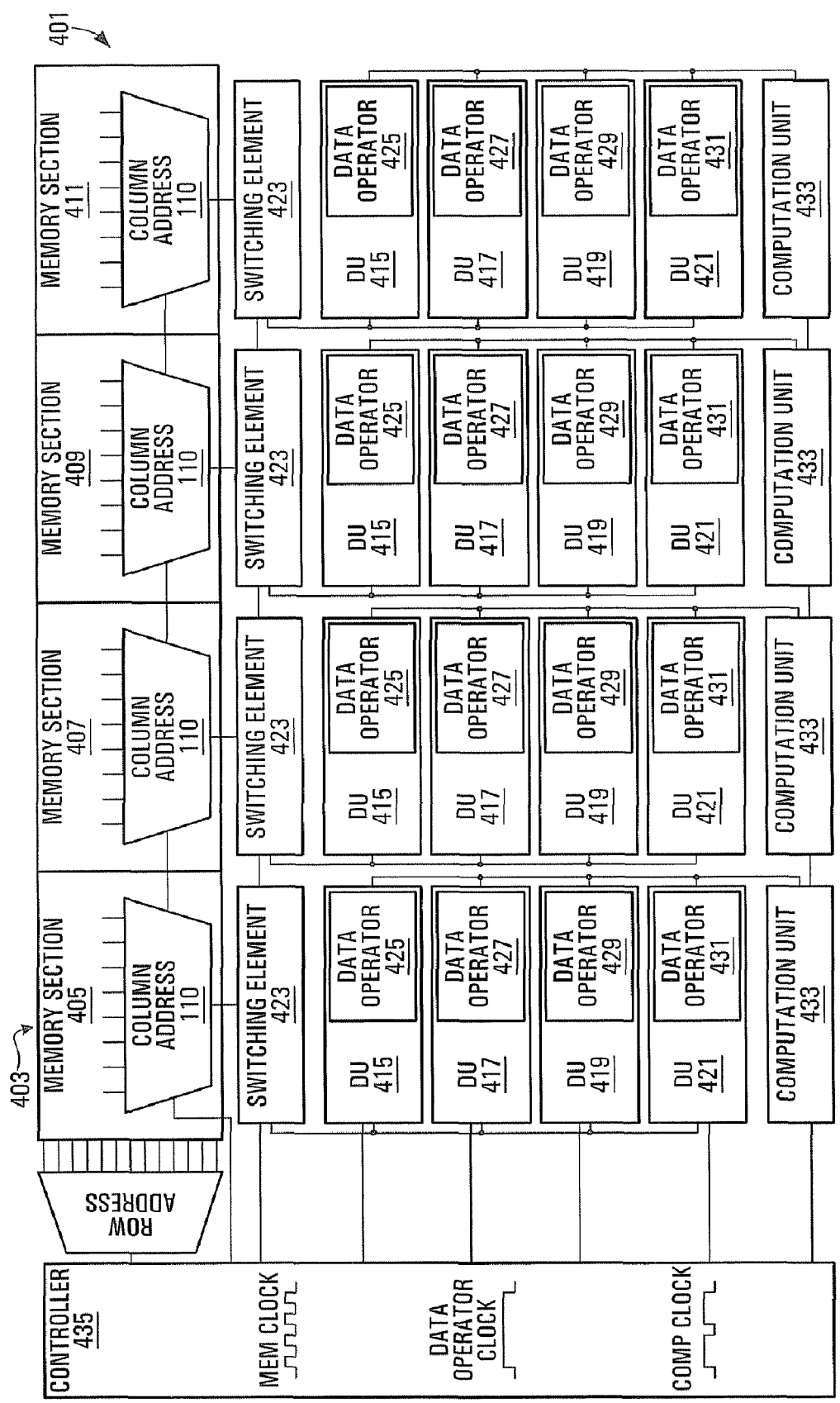
FIG. 7 shows a block diagram of a data processor according to another embodiment of the present invention.

An embodiment of the present invention which incorporates any one or more of these further aspects of the present invention is shown in FIG. 7. Referring to FIG. 7, a data processor apparatus 401 comprises a memory 403 having a plurality of memory sections 405, 407, 409, 411. Each memory section has at least one and in this embodiment a plurality of columns of memory storage elements for storing data. The data processor apparatus further comprises a plurality of data receiving units 415, 417, 419, 421 each capable of receiving data from a respective memory section 405, 407, 409, 411 via an optional switching element 423. In this embodiment, each data receiving unit includes a data operator 425, 427, 429, 431 which in this example are all capable of performing the same operation on data to one or more other data operators. However, in other embodiments, one or more data operators may be capable of performing a different operation on data. The data processor apparatus further includes one or more computational unit 433 each of which is coupled for receiving data from at least one data receiving unit, and in the present embodiment, the computational unit 433 is capable of receiving data from each data receiving unit 415, 417, 419, 421. Each set of data receiving units 415, 417, 419, 421 and their associated computational unit(s) 433 constitutes a processor group (which may optionally include a switching element 433) and each group is connected to a respective memory section 405, 407, 409, 411. The elements of each processor group are generally aligned with their memory sections and the processor groups together form a two dimensional array of elements.

The data processor apparatus further comprises a controller 435 for controlling operations of the memory (i.e. read and write operations), operations of the optional switching element 423, if present, and operations of the data receiving units 415 to 421 and the computational unit 433.

In this example, the memory is adapted to operate at a different rate to each of the data operators 425, 427, 429, 431. The computational unit 433 may be adapted to operate at a different rate to either the memory, a data operator or both.

Examples of operations of the data processor apparatus are illustrated in FIGS. 8A and 8B.

In the example of FIG. 8A, the memory clock runs four times faster than the data operator clock, and the computational unit clock runs two times faster than the data operator clock. This differential timing allows data to be downloaded from memory into each data receiving unit 415, 417, 419, 421 in the first data operator clock cycle 501. In the second data operator clock cycle 503, each data operator 425, 427, 429, 431 operates on the data in parallel. In the third data operator clock cycle 505, the computational unit performs operations on data from two of the data operators (data 0, data 1). In a fourth data operator cycle (not shown), the computational unit 433, operates on data from the other two data operators. Advantageously, operating these various components at different speeds, reduces the latency of the device, and allows the power drawn by each operation to be more evenly distributed over the operating cycles. In another embodiment, the computational unit may run at the same rate as the memory clock, so that data 0, 1, 2 and 3 are all processed in one operator clock cycle, and can also all be stored to memory in one operator clock cycle to reduce the latency of the device further.

In the example shown in FIG. 8B, the memory again operates at four times the rate of each data operator. In the first cycle 511, data is downloaded from the memory into each data operator 425, 427, 429, 431. In the second data operator cycle 513, each data operator operates on the downloaded data in parallel. In the third data operator cycle 515, data from the data operators is stored into memory. Thus, this example comprises a single read from memory cycle, a single operator cycle and a single write cycle, and therefore the latency is no more than a data processor having a one dimensional array of processor elements below a memory block in which each processor element has its own dedicated memory section. However, in the present architecture, since a plurality of data receiving units share the same memory section, the memory can be deeper which allows the data processor apparatus to take up less space. An advantage of this architecture is that as a larger memory can be used, the memory can be more dense. In addition, this also allows a DRAM to be used instead of a SRAM.

It will be appreciated that any suitable differential timing between the memory, data operators and computational units may be implemented, as required. For example, in another embodiment, the memory may operate at twice the rate of a data operator, in which case it requires two data operator cycles to download data from memory into two data receiving units. This may assist in distributing the power drawn by the processor more evenly over time.

The data operator may comprise means for performing any operation or operations on data, and may for example comprise a sum of absolute differences operator, a multiplier, a floating point operator and/or an arithmetic logic unit, or other processor or operational logic. Similarly, the computational unit may be adapted to perform any required operation. A computational unit may require a number of cycles to perform operations on data between the input and output thereof and the controller may be adapted to run the computational unit at a faster rate than for example a data operator to reduce the latency of the device.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A data processor apparatus, comprising:
a plurality of data receiving units each configured to be in bi-directional communication with a data source and with another of the plurality of data receiving units with respect to receiving and providing data;
a plurality of computational elements being organized in a certain order for performing different operations in a successive order on the data, the data passing through all of the plurality of computational elements, each of the plurality of computational elements configured to be in direct bi-directional communication with a respective set of the plurality of data receiving units, to perform a different operation in succession on the data received from another of the plurality of computational element, and to be additionally coupled to, and in bi-directional communication with, the other plurality of computational elements,
wherein a first computational element of the plurality of computational elements receives and operates on the data from the plurality of data receiving units and transfers the operated data to a next computational element in the next clock cycle in the successive order, and the data is received one clock cycle apart in a successive order from each of the plurality of data receiving units, and
wherein each of the plurality of computational elements following the first computational element receives output data that was operated on by one computational element directly before a current computational element, operates on the output data, and transfers the operated output data to a following computational element in the next clock cycle in the successive order;
a plurality of processor groups, each of the plurality of processor groups configured to include a set of the plurality of data receiving units, and to be in bi-directional communication with the data source and the plurality of computational elements coupled to the each of the plurality of data receiving units; and
a controller configured to control a flow of the data from each of the plurality of data receiving units to the plurality of computational elements, and to control the plurality of processor groups,
wherein the plurality of data receiving units are respectively coupled to the plurality of computational elements, such that the plurality of data receiving units share the each of the plurality of computational elements, the each of the plurality of computational elements receives the data from each of the plurality of data receiving units in the respective set, and provides the operated data to each of the plurality of data receiving units in the respective set.

2. The data processor apparatus as claimed in claim 1, wherein the controller is configured to control the flow of data from the data source to each of the plurality of data receiving units.

3. The data processor apparatus as claimed in claim 1, wherein the controller is configured to pass data from each of the plurality of data receiving units successively to the plurality of computational elements.

4. The data processor apparatus as claimed in claim 1, wherein the controller is configured to pass data from the data source successively to each of the plurality of data receiving units.

5. The data processor apparatus as claimed in claim 1, wherein the controller is configured to pass data from the data source to one of the plurality of data receiving units at a same time as passing data from the one of the plurality of data receiving units to the plurality of computational elements.

6. The data processor apparatus as claimed in claim 1, wherein the data source includes a memory having a plurality of columns and rows and means for connecting each of the plurality of data receiving units to a corresponding column of the memory.

7. The data processor apparatus as claimed in claim 1, wherein the each of the computational elements is one selected from a group consisting of a multiplier, a processor configured to calculate a sum of absolute differences, an arithmetic logic unit and a floating point unit.

8. The data processor apparatus as claimed in claim 1, where one of the plurality of the computational elements is operable to perform an operation when another computational element is performing a different operation.

9. The data processor apparatus as claimed in claim 1, wherein at least one of the plurality of data receiving units comprises a computational unit capable of performing an operation on data.

10. The data processor apparatus as claimed in claim 1, wherein at least one of the plurality of data receiving units comprises at least one data register.

11. The data processor apparatus as claimed in claim 1, wherein one or more of the plurality of data receiving units are configured to receive a multiple bit word.

12. The data processor apparatus as claimed in claim 1, wherein the controller is configured to control the each of the plurality of processor groups with a same instruction or set of instructions.

13. The data processor apparatus as claimed in claim 1, wherein the controller is configured to send a same instruction or set of instructions to the each of the plurality of processor groups simultaneously.

14. The data processor apparatus as claimed in claim 1, wherein a circuit area of the each of the plurality of computational elements is greater than an area of at least one of the plurality of data receiving units.

15. The data processor apparatus as claimed in claim 1, wherein the data comprises at least one of image data and audio data.

16. The data processor apparatus as claimed in claim 1, wherein at least one of the plurality of data receiving units comprises a plurality of elements, and each of the plurality of elements is configured to handle single bit data and pass the single bit data to the plurality of computational elements.

17. The data processing apparatus as claimed in claim 16, wherein the plurality of elements is configured together for handling a multiple bit word, wherein each element handles a single bit of the multiple bit word.

18. The data processor apparatus as claimed in claim 1, wherein the plurality of data receiving units includes at least a first and a second data receiving units, and the plurality of computational elements includes at least a first and a second computational elements,
wherein, in one clock cycle, the first computational element operates on a first data from the first data receiving unit, while the second computational element operates on a second data from the second data receiving unit, and
wherein the first computational element previously has operated on the second data and has transferred the operated second data to the second computational element during a clock cycle preceding the one clock cycle.

19. A data processor apparatus, comprising:
a memory;
a plurality of processor elements in which at least one processor element is capable of bi-directional communication with the memory and at least another processor element is capable of bi-directional communication with at least one of the memory and the at least one processor element;
a plurality of computation units coupled to each of the plurality of processor elements for direct bi-directional communication and being organized in a certain order for performing different operations in a successive order on data, the data passing through all of the plurality of computation units, the at least one processor element and the at least another processor element sharing each of the plurality of computation units, and the each of the plurality of computation units being configured to perform a different operation in succession on the data received from another of the plurality of computation units, and the each of the plurality of computation units is additionally coupled to, and in bi-directional communication with, the other plurality of computation units; and
a controller configured to control a speed of operation of each of the plurality of processor elements such that a speed at which the at least one processor element operates is different from a speed at which the at least another processor element operates,
wherein the plurality of processor elements and a plurality of data operators together comprise a processor group, and the data processor apparatus further comprises a plurality of processor groups, each processor group being capable of bi-directional communication with the memory,
wherein a first computation unit of the plurality of computation units receives and operates on the data from the plurality of processor elements and transfers the operated data to a next computation unit in the next clock cycle in the successive order, and the data is received one clock cycle apart in a successive order from each of the plurality of data receiving units, and
wherein each of the plurality of computation units following the first computation unit receives output data that was operated on by one computation unit directly before a current computation unit, operates on the output data, and transfers the operated output data to a following computation unit in the next clock cycle in the successive order.

20. The data processor apparatus as claimed in claim 19, wherein each of the plurality of processor elements is capable of operating on data originating from a same section of the memory.

21. The data processor apparatus as claimed in claim 19, wherein the memory comprises a column of data storage elements, and each processor element is arranged to be capable of accessing a data storage element of the column of the data storage elements.

22. The data processor apparatus as claimed in claim 19, wherein the plurality of processor elements is aligned with a column of data storage elements.

23. The data processor apparatus as claimed in claim 19, wherein the plurality of the processor groups is arranged together in a two-dimensional array.

24. The data processor apparatus as claimed in claim 19, wherein the plurality of the processor groups is arranged next to one another.

25. The data processor apparatus as claimed in claim 19, wherein the memory comprises a plurality of memory sections extending in a first direction, and successive processor groups are arranged along the first direction.

26. The data processor apparatus as claimed in claim 19, wherein each of the plurality of the processor elements comprises one of a plurality of data operators, and each other data receiving units comprises another of the plurality of data operators, wherein each of the plurality of data operators is capable of performing a same operation on the data.

27. The data processor apparatus as claimed in claim 19, wherein a plurality of data operators is configured to receive the data from each of the plurality of processor elements and the controller is configured to control flow of the data from each of the plurality of processor elements to the plurality of data operators.

28. The data processor apparatus as claimed in claim 19, wherein each of the plurality of the processor elements comprises one of a plurality of data operators, and each other data receiving units comprises another of the plurality of data operators, wherein each of the plurality of data operators is capable of performing a different operation on the data.

29. The data processor apparatus as claimed in claim 19, wherein the plurality of the processor elements includes at least a first and a second processor elements, and the plurality of the computation units includes at least a first and a second computation units, wherein, in one clock cycle, the first computation unit operates on a first data from the first processor element, while the second computation unit operates on a second data from the second processor element, and wherein the first computation unit previously has operated on the second data and has transferred the operated second data to the second computation unit during a clock cycle preceding the one clock cycle.

\* \* \* \* \*